(No Model.)

H. HAMILTON.
ATTACHMENT FOR CLEANING SHOES OF THRASHING MACHINES.

No. 251,045. Patented Dec. 20, 1881.

Witnesses,
Geo. H. Strong.
Frank A. Brooks

Inventor,
Hugh Hamilton
By Dewey & Co.
Attys

United States Patent Office.

HUGH HAMILTON, OF VISALIA, CALIFORNIA.

ATTACHMENT FOR CLEANING-SHOES OF THRASHING-MACHINES.

SPECIFICATION forming part of Letters Patent No. 251,045, dated December 20, 1881.

Application filed February 14, 1881. (No model.)

*To all whom it may concern:*

Be it known that I, HUGH HAMILTON, of Visalia, county of Tulare, State of California, have invented an Attachment for the Cleaning-Shoes of Thrashing-Machines; and I hereby declare the following to be a full, clear, and exact description thereof.

My invention relates to that class of agricultural implements known as "thrashing-machines," and more especially to certain improvements therein consisting in an attachment for the cleaning-shoe, to prevent the riddles from becoming choked with straw, all of which will hereinafter more fully appear.

Figure 1:
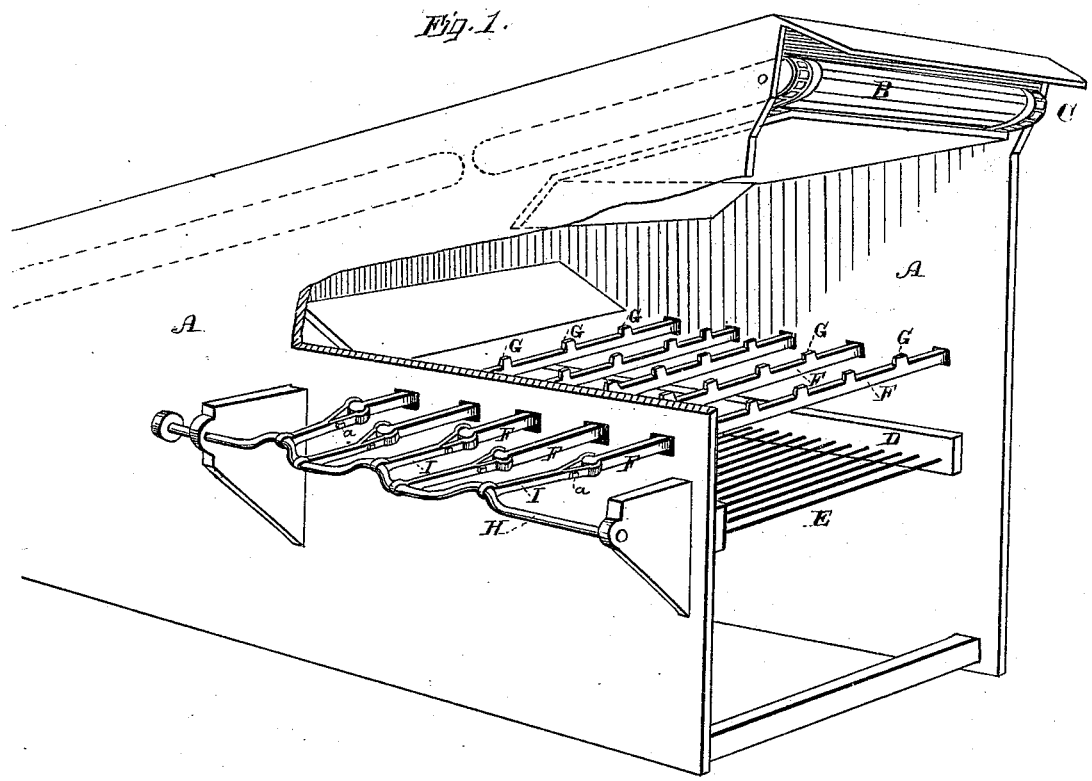
Figure 2:
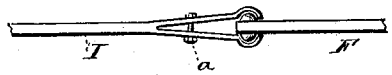

Referring to the accompanying drawings, Figure 1 is a view of my invention, showing its application to a thrashing-machine. Fig. 2 shows the joint-connection.

Let A represent the frame of a thrashing-machine; B, the carrying-belt from the cylinder to the chute C.

D represents the shoe, containing the vibrating screens or riddles E, upon which the carrying-belt discharges its grain.

The inability of the straw-carrier to carry off all the straw, and the consequent discharge of a portion of it upon the riddle, has always been attended with detrimental consequences because of the frequent choking or clogging of the parts. A portion of the long straw passing down with the grain and chaff is discharged upon the riddle, and becoming packed the grain cannot be separated, nor the straw be blown away by the fan-blower, but remains to choke the riddle and clog the entire shoe.

The object of my invention is to obviate this difficulty by providing a means for stirring up the mass of straw, and separating it sufficiently to allow the grain, chaff, and finer straw to drop through upon the riddle, while the remaining straw is blown away. For this purpose my attachment is placed between the chute C at the end of the carrying-belt and the riddles E in the shoe. It consists of a number of horizontal parallel bars or rods, F, placed conveniently close together and extending across the frame A and through its sides in appropriate boxes, to allow them to be moved forward and back across the frame. These rods or bars are formed with upwardly-projecting points or teeth G over their entire length between the sides of the frame. These teeth may be placed at any desired distances apart, and may be formed in any practicable manner. The bars or rods F are preferably formed of malleable iron, and have the teeth or projections G cast upon them. I can have any number of rods F which I may deem practicable, either enough to cover the whole surface of the riddles or any less portion, preferably about one-half.

On one side of the frame A, journaled in appropriate frames, is the eccentric or crank shaft H, formed of a series of curves or bends, as shown. To each crank or eccentric is attached by a loose joint the connecting-rods I, said rods being hinged or jointed to the projecting ends of the rods F. This connection may be formed in any practicable manner; but I prefer a joint consisting of semi-globular projections on each side of the rods F, over which the split ends of the connecting-rods I fit, said ends being provided on the inside with depressions for receiving and fitting over the projections on the rods I, thus forming a joint or hinge.

A pin or bolt, *a*, extends through the split ends of the rods I, whereby the joint is tightened or otherwise adjusted. When the eccentric-shaft H is turned it will cause the transverse rods F to move forward and back across the frame, and because of their peculiar connections every alternate one moves in a direction opposite to the others, one half of them moving one way, while the other half moves the other way. Thus a contrary motion is made which will serve to stir up the stuff upon the rods and prevent the straw from becoming packed with the grain, so that the smaller and lighter portions may drop through, while the longer straw is prevented from falling upon the riddle, but is kept on top and will be blown away. The shaft H will be driven by any of the other pulleys, if found convenient.

I can, if found desirable, give to the rods F an upward-and-downward motion, as well as the motion hereinbefore described, which may better serve the object in view. To do this I place another eccentric-shaft, similar to the shaft H, upon the other side of the frame A, and connect the rods F directly to both shafts, one end of a rod being jointed to a bend in the shaft at its farthest or highest point, while the other end of the same rod is jointed to the bend in the other shaft at its nearest or lowest point, all the rods being likewise alternately joined. The boxes in the sides of the frame A, through which the rods pass, would in that case have to be elongated to permit the rods to move up and down. As the straw-carrier will not separate all the straw from the grain a portion of the straw, together with the grain and chaff, is discharged from the carrying-belt B, through the chute C, upon this grating formed by the transverse parallel rods F, which, by their constant motion and their projecting teeth passing each other, stir up and prevent the straw from becoming packed with the grain and chaff, the lighter matter passing through upon the riddle, but retaining a portion of the straw until it is blown away by the fan-blower. Thus the riddles are prevented from becoming choked, and the shoe from being clogged and unable to perform its work.

Having thus described my invention, what I claim as new, and desire to secure by Letters Patent, is—

1. In combination with the transverse toothed bars or rods F, supported so as to be moved horizontally back and forward above the riddle, the crank or eccentric shaft H, having connecting-rods I, uniting the cranks with the bars, said cranks being so placed as to cause the adjacent bars to move in opposite directions, substantially as described.

2. In a thrashing-machine, a grating formed between the chute and riddle, consisting of a number of horizontal parallel transverse rods provided with upwardly-projecting teeth, said rods being given a motion back and forth and up and down by proper connections with eccentric shafts, whereby the straw, when discharged upon said grating, is prevented from being packed with the grain, substantially as described.

In witness whereof I have hereunto set my hand.

HUGH HAMILTON.

Witnesses:
  WM. F. BOOTH,
  S. H. NOURSE.